United States Patent
Krauss et al.

(10) Patent No.: US 8,945,716 B2
(45) Date of Patent: Feb. 3, 2015

(54) PROCESS FOR PRODUCING WATER-ABSORBING POLYMER PARTICLES

(71) Applicant: BASF SE, Ludwigshafen (DE)

(72) Inventors: Roland Krauss, Neustadt (DE); Thomas Gieger, Ludwigshafen (DE); Volker Klock, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/920,515

(22) Filed: Jun. 18, 2013

(65) Prior Publication Data

US 2013/0338328 A1    Dec. 19, 2013

Related U.S. Application Data

(60) Provisional application No. 61/661,371, filed on Jun. 19, 2012.

(51) Int. Cl.
*B32B 27/08* (2006.01)

(52) U.S. Cl.
USPC .......... 428/503; 524/700; 526/318.5

(58) Field of Classification Search
USPC .......... 428/503; 524/700; 526/318.5
See application file for complete search history.

(56) References Cited

U.S. PATENT DOCUMENTS

| | | | | |
|---|---|---|---|---|
| 6,323,252 B1 * | 11/2001 | Gartner et al. | ......... | 521/149 |
| 6,623,848 B2 * | 9/2003 | Brehm et al. | ......... | 428/327 |
| 7,682,702 B2 * | 3/2010 | Nitschke | ......... | 428/503 |
| 7,786,211 B2 * | 8/2010 | Stueven et al. | ......... | 524/700 |
| 8,349,946 B2 * | 1/2013 | Stueven et al. | ......... | 524/700 |

FOREIGN PATENT DOCUMENTS

| | | |
|---|---|---|
| EP | 0 497 623 A2 | 8/1992 |
| EP | 0 508 810 | 10/1992 |
| EP | 0 574 248 | 12/1993 |
| JP | 06-073518 | 3/1994 |
| JP | 06-107800 | 4/1994 |
| JP | H06107800 A | 4/1994 |
| WO | WO-89/09090 A1 | 10/1989 |

OTHER PUBLICATIONS

Buchholz, Fredric L., et al. *Modern Superabsorbent Polymer Technology*, "Commercial Processes for the Manufacture of Superabsorbent Polymers." New York: John Wiley & Sons, Inc., 1998, pp. 71-103.
Mogensen-ALLGAIER-Gruppe, "Vibro-Stangensizer" (Oct. 25, 2005), retrieved from Internet: http://www.mogensen.de/de/vibrostangensizer.htm. Accessed Sep. 25, 2013.
Mogensen-ALLGAIER-Gruppe, "Stangensizer" (Sep. 24, 2006), retrieved from Internet: http://www.mogensen.de/de/stangensizer.htm. Accessed Sep. 25, 2013.
International Search Report in international application No. PCT/EP2013/061901, dated Oct. 17, 2013.

* cited by examiner

*Primary Examiner* — Peter D. Mulcahy
*Assistant Examiner* — Henry Hu
(74) *Attorney, Agent, or Firm* — Marshall, Gerstein & Borun LLP

(57) ABSTRACT

A process for producing water-absorbing polymer particles, comprising polymerization of a monomer solution or suspension, classification and drying of the resulting moist polymer gel, and comminution of the coarse fraction removed in the classification of the moist polymer gel, wherein the classification of the moist polymer gel is performed by means of a plurality of bar decks arranged in a cascade in a vibrating frame.

15 Claims, No Drawings

PROCESS FOR PRODUCING WATER-ABSORBING POLYMER PARTICLES

CROSS-REFERENCE TO RELATED APPLICATIONS

This application claims the benefit of U.S. provisional patent application No. 61/661,371, filed Jun. 9, 2012, incorporated herein by reference in its entirety.

The present invention relates to a process for producing water-absorbing polymer particles, comprising polymerization of a monomer solution or suspension, classification and drying of the resulting moist polymer gel, and comminution of the coarse fraction removed in the classification of the moist polymer gel, wherein the classification of the moist polymer gel is performed by means of a plurality of bar decks arranged in a cascade in a vibrating frame.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With an increasing amount of crosslinker, the centrifuge retention capacity (CRC) falls and the absorption under a pressure of 21.0 g/cm$^2$ (AUL0.3 psi) passes through a maximum.

To improve the use properties, for example, permeability of the swollen gel bed (SFC) in the diaper and absorption under a pressure of 49.2 g/cm$^2$ (AUL0.7 psi), water-absorbing polymer particles are generally surface postcrosslinked. This increases the level of crosslinking of the particle surface, which can at least partly decouple the absorption under a pressure of 49.2 g/cm$^2$ (AUL0.7 psi) and the centrifuge retention capacity (CRC). This surface postcrosslinking can be performed in the aqueous gel phase. Preferably, however, dried, ground and sieved polymer particles (base polymer) are surface coated with a surface postcrosslinker and thermally surface postcrosslinked. Crosslinkers suitable for that purpose are compounds which can form covalent bonds to at least two carboxylate groups of the water-absorbing polymer particles.

The polymer gels produced by polymerization are preferably dried on belt driers. As a result of inhomogeneities, the gel layer is often dried in a non-uniform manner, such that either portions of the polymer gel have to be overdried, which causes the product quality to suffer, or portions of the polymer gel are dried only incompletely. Incompletely dried polymer particles lead to problems in the further process steps and have to be removed.

Processes for avoiding incompletely dried polymer particles in the drying are known, for example, from JP-A-06-73518, JP-A-06-107800, EP-A-0 497 623, EP-A-0 508 810 and EP-A-0 574 248.

JP-A-06-73518 describes a process for drying hydrogels on a belt drier, in which the drier performance is adapted continuously to the current layer thickness of the gel layer, as a result of which the proportion of incompletely dried polymer particles is reduced.

JP-A-06-107800 teaches that the overdrying and removal of incompletely dried polymer particles can be avoided when oversize polymer gel particles are removed at the earlier stage of prior to drying.

EP-A-0 497 623 discloses a process in which the polymer gel is extruded prior to drying.

EP-A-0 508 810 and EP-A-0 574 248 teach the use of a specific kneading reactor as a polymerization reactor, as a result of which relatively large polymer gel particles are avoided prior to drying.

It was an object of the present invention to provide an improved process for producing water-absorbing polymer particles, especially a simple and inexpensive removal of oversize polymer gel particles (coarse fraction) prior to drying.

The object was achieved by a process for producing water-absorbing polymer particles, comprising polymerization of a monomer solution or suspension comprising a) at least one ethylenically unsaturated monomer which bears acid groups and may be at least partly neutralized, b) at least one crosslinker, c) at least one initiator, d) optionally one or more ethylenically unsaturated monomers copolymerizable with the monomers mentioned under a) and optionally one or more water-soluble polymers, classification and drying of the resulting moist polymer gel, and comminution of the coarse fraction removed in the classification of the moist polymer gel, wherein the classification of the moist polymer gel is performed by means of a plurality of bar decks arranged in a cascade in a vibrating frame.

A bar deck is an arrangement of virtually parallel bars. The bars are inclined in longitudinal direction, such that the polymer gel can move over the bar deck in longitudinal direction. Particles smaller than the distance between the bars can fall downward through the bar deck and are collected.

The bar decks are additionally arranged in a cascade, i.e. such that the polymer gel moves to the end of the foremost bar deck, and thence to the start of the next bar deck, etc.

The removal and comminution of the coarse fraction prior to drying avoids incompletely dried polymer particles and improves the efficiency of the drying.

The bar decks are preferably inclined from 5 to 11°, more preferably from 6 to 10° and most preferably from 7 to 9° in product flow direction relative to the horizontal.

The bars are typically clamped at the start, based on the product flow direction, such that the individual bars can vibrate at the end in vertical direction.

The vibrating frame vibrates in the vertical with an amplitude of preferably 2 to 7.5 mm, more preferably 2.5 to 5.5 mm and most preferably 3 to 4.5 mm, the amplitude being measured at the machine housing.

The individual bars vibrate in the vertical with a frequency of preferably 5 to 50 Hz, more preferably 10 to 25 Hz and most preferably 12 to 20 Hz.

The inclination, the amplitude and the frequency can be used to adjust the residence time on the bar decks, a longer residence time increasing the separation sharpness.

The bars have a diameter of preferably 2 to 14 mm, more preferably 4 to 12 mm and most preferably 6 to 10 mm. With decreasing diameter, the mechanical stability of the bars decreases. With rising diameter, the free cross section of the bar decks decreases.

The clearance between the bars at rest is preferably 5 to 25 mm, more preferably 10 to 20 mm and most preferably 12 to 18 mm. Vertical staggering of the bars can increase the separating action.

In a preferred embodiment of the present invention, the bars have been coated with a water-repellent material, which means that the surface of the bars has a contact angle with respect to water of preferably at least 60°, more preferably of at least 80° and most preferably of at least 100°.

The contact angle is a measure of the wetting characteristics of a liquid, water here, with respect to a surface and can be determined by customary methods, for example to ASTM D 5725. A low contact angle means good wetting and a high contact angle poor wetting.

Suitable coatings are, for example, fluorinated polymers, such as perfluoroalkoxyethylene, polytetrafluoroethylene, ethylene-chlorotrifluoroethylene copolymers, ethylene-tetrafluoroethylene copolymers and fluorinated polyethylene, especially perfluoromethyl vinyl ether-tetrafluoroethylene copolymers.

The water-repellent coating prevents caking onto the bars and improves the separation sharpness.

The temperature of the moist polymer gel in the course of classification is preferably from 50 to 100° C., more preferably from 60 to 90° C. and most preferably from 70 to 80° C.

Advantageously, the classification of the moist polymer gel is thermally insulated from the environment. This makes it possible to avoid cooling of the moist polymer gel during classification. In addition, steam can be introduced.

By virtue of the abovementioned conditions, the optimal temperatures for the classification of the moist polymer gel can be established.

The vibrating frame with the bar decks is typically driven by means of an unbalance motor. The propulsion direction of the unbalance motor based on the horizontal is preferably from 30 to 60°, more preferably from 40 to 50° and most preferably from 43 to 47°.

The throughput of moist polymer gel in the course of classification is preferably from 1000 to 4500 kg/m$^2$h, more preferably from 2000 to 3500 kg/m$^2$h and most preferably from 2500 to 3000 kg/m$^2$h. The separation sharpness passes through an optimum with rising throughput.

The production of the water-absorbing polymer particles is described in more detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, an acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.05 to 1.5% by weight, more preferably from 0.1 to 1% by weight, most preferably from 0.2 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators or photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneading reactor, the polymer gel formed in the polymerization of an aqueous monomer solution or suspension is comminuted continuously by, for example, contrarotatory stirrer shafts, as described in WO 2001/038402 A1. Polymerization on the belt reactor is described, for example, in DE 38 25 366 A1 and U.S. Pat. No. 6,241,928. Polymerization in a belt reactor forms a polymer gel which has to be comminuted in a further process step, for example in an extruder or kneader.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably 10 to 30 mol % and more preferably 15 to 25 mol % of the acid groups before the polymerization by adding a portion of the neutralizing agent directly to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then typically dried with a belt drier until the residual moisture content is preferably 0.5 to 15% by weight, more preferably 1 to 10% by weight and most preferably 2 to 8% by weight, the residual moisture content being determined by EDANA recommended test method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight.

Thereafter, the dried polymer gel is ground and classified, and the apparatus used for grinding may be multistage roll mills, preferably two or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles having a particle size of greater than 150 µm is preferably at least 90% by weight, more preferably at least 95% by weight and most preferably at least 98% by weight.

Polymer particles with too small a particle size lower the permeability (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of particles having a particle size of at most 600 μm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amido acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are hydroxide, chloride, bromide, sulfate, hydrogensulfate, carbonate, hydrogencarbonate, nitrate, phosphate, hydrogenphosphate, dihydrogenphosphate and carboxylate, such as acetate, citrate and lactate. Salts with different counterions are also possible, for example basic aluminum salts such as aluminum monoacetate or aluminum monolactate. Aluminum sulfate, aluminum monoacetate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either during or after the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting characteristics and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably carried out in contact driers, more preferably paddle driers, most preferably disk driers. Suitable driers are, for example, Hosokawa Bepex® Horizontal Paddle Dryers (Hosokawa Micron GmbH; Leingarten; Germany), Hosokawa Bepex® Disc Dryers (Hosokawa Micron GmbH; Leingarten; Germany), Holo-Flite® driers (Metso Minerals Industries Inc.; Danville; USA) and Nara Paddle Dryers (NARA Machinery Europe; Frechen; Germany). Moreover, fluidized bed driers may also be used.

The drying can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

In a preferred embodiment of the present invention, the water-absorbing polymer particles are cooled after the thermal drying. The cooling is preferably performed in contact coolers, more preferably paddle coolers and most preferably disk coolers. Suitable coolers are, for example, Hosokawa Bepex® Horizontal Paddle Coolers (Hosokawa Micron GmbH; Leingarten; Germany), Hosokawa Bepex® Disc Coolers (Hosokawa Micron GmbH; Leingarten; Germany), Holo-Flite® coolers (Metso Minerals Industries Inc.; Danville; USA) and Nara Paddle Coolers (NARA Machinery Europe; Frechen; Germany). Moreover, fluidized bed coolers may also be used.

In the cooler, the water-absorbing polymer particles are cooled to 20 to 150° C., preferably 30 to 120° C., more preferably 40 to 100° C. and most preferably 50 to 80° C.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging. The remoisturizing is advantageously performed in the cooler after the thermal drying.

Suitable coatings for improving the free swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably 0 to 15% by weight, more preferably 0.2 to 10% by weight and most preferably 0.5 to 8% by weight, the moisture content being determined by EDANA recommended test method No. WSP 230.2-05 "Mass Loss Upon Heating".

The water-absorbing polymer particles produced by the process according to the invention have a proportion of particles having a particle size of 300 to 600 μm of preferably at least 30% by weight, more preferably at least 50% by weight and most preferably at least 70% by weight.

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Fluid Retention Capacity in Saline, After Centrifugation".

The water-absorbing polymer particles produced by the process according to the invention have an absorption under a pressure of 49.2 $g/cm^2$ of typically at least 15 g/g, preferably at least 20 g/g, more preferably at least 22 g/g, especially preferably at least 24 g/g and most preferably at least 26 g/g. The absorption under a pressure of 49.2 $g/cm^2$ of the water-absorbing polymer particles is typically less than 35 g/g. The absorption under a pressure of 49.2 $g/cm^2$ is determined analogously to EDANA recommended test method No. WSP 242.2-05 "Absorption Under Pressure, Gravimetric Determination", except that a pressure of 49.2 $g/cm^2$ is established instead of a pressure of 21.0 $g/cm^2$.

The EDANA test methods are obtainable, for example, from EDANA, Avenue Eugène Plasky 157, B-1030 Brussels, Belgium.

EXAMPLES

Example 1

By continuously mixing deionized water, 50% by weight sodium hydroxide solution and acrylic acid, an acrylic acid/sodium acrylate solution was prepared such that the degree of neutralization corresponded to 69.0 mol %. The solids content of the monomer solution was 43.5% by weight. The crosslinker used was 3-tuply ethoxylated glyceryl triacrylate (purity approx. 85% by weight). The amount used was 0.32% by weight, based on unneutralized acrylic acid.

The free-radical polymerization was initiated using 0.01% by weight of ascorbic acid, 0.12% by weight of sodium peroxodisulfate and 0.002% by weight of hydrogen peroxide, based in each case on unneutralized acrylic acid.

Between the addition point for crosslinker and the addition sites for the hydrogen peroxide/sodium peroxodisulfate, the monomer solution was inertized with nitrogen.

The reaction was conducted in a List ORP 250 Contikneter continuous kneader reactor (LIST AG, Arisdorf; Switzerland). The throughput of the monomer solution was 800 kg/h. The output weir was open to the maximum degree (weir height 78 mm).

The resulting polymer gel was collected in a gel bunker and withdrawn by means of a discharge screw from the gel bunker for further processing.

The moist polymer gel had a temperature of approx. 75° C. and was classified by means of an SV 0536 bar sizer (Mogensen GmbH & Co. KG; Wedel; Germany). The screen throughput was 1224 kg/h. The bar sizer had three bar decks, arranged in a cascade, with a length of 500 mm and a width of 500 mm. The bar decks were each inclined by 8° relative to the horizontal in product flow direction. The bars had a diameter of 8 mm and were stainless steel (1.4571 material) coated with MFA® (copolymer of tetrafluoroethylene and perfluorovinyl methyl ether). The clearance between the bars at rest was 15 mm. The bars were secured at the start, based on the product flow direction, such that the individual bars were mobile at the end in vertical direction.

The bar decks were secured in a vibrating frame and were driven by means of an unbalance motor. The propulsion direction of the unbalance motor based on the horizontal was 45°. The bar sizer vibrated with an amplitude of 3.7 mm and a frequency of 16 Hz.

The housing of the bar sizer was thermally insulated. In addition, approx. 4.5 kg/h of steam at a temperature of approx. 120° C. were metered into the bar sizer.

The polymer gel removed with the bar sizer (coarse fraction) was comminuted by means of an LSRE 75 R extruder (Sela Maschinen GmbH; Harbke; Germany). The extruder had 12 holes with a diameter of 8 mm.

To check the separation sharpness, 1.5 kg of removed polymer gel (coarse fraction) were mixed with 200 g of Sipernat D17 (precipitated silica) and subjected to a screen analysis. The relative proportion of polymer gel with a particle size of less than 15 mm was 2.6% by weight. This proportion states how much good product is removed together with the coarse fraction, based on the total amount of good product in the feed. Ideally, no good product should be removed together with the coarse fraction. The smaller this proportion, the better the separation sharpness of the classification.

Example 2

The procedure was as in example 1. The output weir of the reactor was closed to the maximum degree (weir height 170 mm). The screen throughput was 1212 kg/h.

The relative proportion of polymer gel with a particle size of less than 15 mm was 5.6% by weight.

Example 3

The procedure was as in example 1. Bar decks with uncoated bars were used.

After a few hours, about 20% of the deck area was covered with adhering polymer gel.

Example 4

The procedure was as in example 1. The bar sizer vibrated with an amplitude of 5.2 mm and a frequency of 16 Hz. The screen throughput was 1260 kg/h.

The relative proportion of polymer gel with a particle size of less than 15 mm was 6.9% by weight.

Example 5

The procedure was as in example 1. The bar sizer vibrated with an amplitude of 7.2 mm and a frequency of 16 Hz. The screen throughput was 880 kg/h.

The relative proportion of polymer gel with a particle size of less than 15 mm was 36.4% by weight.

Example 6

The procedure was as in example 5. The degree of neutralization of the acrylic acid/sodium acrylate solution was adjusted to 75 mol % and the solids content of the monomer solution to 40.7% by weight. The bar decks of the bar sizer were each inclined by 9° relative to the horizontal in product flow direction. The screen throughput was 912 kg/h.

The relative proportion of polymer gel with a particle size of less than 15 mm was 11.2% by weight.

Example 7

The procedure was as in example 6. The bar decks of the bar sizer were each inclined by 11° relative to the horizontal in product flow direction. The screen throughput was 424 kg/h.

The relative proportion of polymer gel with a particle size of less than 15 mm was 35.4% by weight.

Example 8

The procedure was as in example 1. The screen throughput was 870 kg/h.

The relative proportion of polymer gel with a particle size of less than 15 mm was 6.0% by weight.

The invention claimed is:

1. A process for producing water-absorbing polymer particles, comprising
   A. polymerizing a monomer solution or suspension comprising
      a) at least one ethylenically unsaturated monomer which bears an acid group and optionally is partly neutralized,
      b) at least one crosslinker,
      c) at least one initiator,
      d) optionally one or more ethylenically unsaturated monomer copolymerizable with the monomer mentioned under a) and
      e) optionally one or more water-soluble polymer,
   B. classifying the resulting moist polymer gel, wherein the classifying of the moist polymer gel is performed by means of a plurality of bar decks arranged in a cascade in a vibrating frame,
   C. comminuting a coarse fraction removed in the classification of the moist polymer gel, then
   D. drying the resulting comminuted moist polymer gel.

2. The process according to claim 1, wherein the bar decks are inclined from 7 to 9° in product flow direction relative to the horizontal.

3. The process according to claim 1, wherein the vibrating frame vibrates in the vertical with an amplitude of 3 to 4.5 mm.

4. The process according to claim 1, wherein the bars vibrate in the vertical with a frequency of 12 to 20 Hz.

5. The process according to claim 1, wherein the bars have a diameter of 6 to 10 mm.

6. The process according to claim 1, wherein the bars have been coated with a water-repellent material.

7. The process according to claim 1, wherein a clearance between the bars at rest is from 12 to 18 mm.

8. The process according to claim 1, wherein a temperature of the moist polymer gel during the classification is from 70 to 80° C.

9. The process according to claim 1, wherein the classification of the moist polymer gel has been thermally insulated from the environment.

10. The process according to claim 1, wherein steam is additionally introduced into the classification of the moist polymer gel.

11. The process according to claim 1, wherein the vibrating frame is driven by means of an unbalance motor.

12. The process according to claim 1, wherein a throughput of moist polymer gel in the course of classification is from 2500 to 3000 kg/m²h.

13. The process according to claim 1, wherein monomer a) is acrylic acid partly neutralized to an extent of at least 50 mol %.

14. The process according to claim 1, wherein monomer a) is partly neutralized to an extent of 25 to 85 mol %.

15. The process according to claim 1, wherein the water-absorbing polymer particles have a centrifuge retention capacity of at least 15 g/g.

* * * * *